United States Patent
Anicic et al.

(10) Patent No.: US 10,929,119 B2
(45) Date of Patent: Feb. 23, 2021

(54) METHOD FOR AMENDING OR ADDING FUNCTIONALITY TO AN AUTOMATION DEVICE

(71) Applicant: Siemens Aktiengesellschaft, Munich (DE)

(72) Inventors: Darko Anicic, Munich (DE); Aparna Saisree Thuluva, Munich (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 16/314,437

(22) PCT Filed: Jun. 30, 2016

(86) PCT No.: PCT/EP2016/065263
§ 371 (c)(1),
(2) Date: Dec. 30, 2018

(87) PCT Pub. No.: WO2018/001482
PCT Pub. Date: Jan. 4, 2018

(65) Prior Publication Data
US 2019/0317752 A1  Oct. 17, 2019

(51) Int. Cl.
*G06F 8/65* (2018.01)
*G05B 19/042* (2006.01)
*G06K 9/72* (2006.01)

(52) U.S. Cl.
CPC ........... *G06F 8/65* (2013.01); *G05B 19/0423* (2013.01); *G06K 9/726* (2013.01)

(58) Field of Classification Search
None
See application file for complete search history.

(56) References Cited

U.S. PATENT DOCUMENTS 7,571,149 B1 * 8/2009 Yanosy, Jr. ............... G06F 8/10
706/52
8,976,708 B1 * 3/2015 Cohn ................... H04L 41/0813
370/254
(Continued)

FOREIGN PATENT DOCUMENTS

EP         2772877 A1    9/2014
WO     2016050257 A1    4/2016

OTHER PUBLICATIONS

Butzin, Björn, et al. "A model based development approach for building automation systems." Proceedings of the 2014 IEEE Emerging Technology and Factory Automation (ETFA). IEEE, 2014.
(Continued)

*Primary Examiner* — Philip Wang
(74) *Attorney, Agent, or Firm* — Lempia Summerfield Katz LLC (57) ABSTRACT

A method for amending or adding functionality to an automation device in an automation systems domain is provided. A semantic representation is provided as a basis for representing the functionality to be amended or added. The semantic model for semantically representing the functionality is not only interpretable but also executable. A machine interpretation and execution is carried out by a semantic reasoner and an event processing engine, respectively, which are both part of a runtime environment implemented on the automation device. The need of implementing a code skeleton is eliminated by an engineer. Instead, the semantic model may be directly executed in a device that has an embedded runtime with reasoning capabilities.

17 Claims, 7 Drawing Sheets

(56) References Cited

U.S. PATENT DOCUMENTS

| | | | | |
|---|---|---|---|---|
| 2004/0003058 A1* | 1/2004 | Trossen | ............ | H04L 29/06027 |
| | | | | 709/220 |
| 2006/0161655 A1* | 7/2006 | Altenhofen | ............. | G06F 16/95 |
| | | | | 709/224 |
| 2011/0239109 A1* | 9/2011 | Nixon | ..................... | G06F 40/14 |
| | | | | 715/236 |
| 2012/0084769 A1* | 4/2012 | Adi | ........................... | G06F 8/63 |
| | | | | 717/174 |
| 2015/0019462 A1* | 1/2015 | De | ........................... | G06N 5/04 |
| | | | | 706/11 |
| 2018/0041566 A1* | 2/2018 | Huang | .................... | H04L 67/06 |
| 2018/0278710 A1* | 9/2018 | Sun | ........................ | H04W 4/70 |
| 2019/0286426 A1* | 9/2019 | Anicic | ...................... | G06F 8/35 |
| 2019/0317752 A1* | 10/2019 | Anicic | .................... | G06K 9/726 |

OTHER PUBLICATIONS

International Search Report and the Written Opinion for International Patent Application PCT/EP2016/065263 dated Apr. 12, 2017.

* cited by examiner

METHOD FOR AMENDING OR ADDING FUNCTIONALITY TO AN AUTOMATION DEVICE

This application is the National Stage of International Application No. PCT/EP2016/065263, filed Jun. 30, 2016. The entire contents of this document are hereby incorporated herein by reference.

TECHNICAL FIELD

The disclosed embodiments relate to a method and computer program product for amending functionality on an automation device or for adding functionality to an automation device. Specifically, the disclosed embodiments relate to methods for representing, discovering, and executing functionality dedicated to automation purposes.

BACKGROUND

A system of physical objects that may be discovered, monitored, controlled, or interacted with by electronic devices that communicate over various networking interfaces is commonly referred to as »Web of Things«.

In the industrial domain, specifically in the field of automation facilities, Web of Things techniques are believed to launch a revolutionary concept that is frequently referred to as »Industry 4.0«.

According to the Web of Things concept, devices or »things« are connected to a web and are autonomously able to extend or update corresponding functionality by installing a piece of software. Since automation facilities are inevitably more complex than general »things«, the term »Web of Systems« for denoting automation facilities is preferred over the common »Web of Things« paradigm.

Underused equipment resources, which are frequently found in automation facilities, may provide enhanced or new utilisation opportunities provided that the equipment resources support straightforward possibilities for creation, discovery, and deployment of modular software.

Automation facilities may include one or more devices (e.g., embedded devices) in an industrial domain. Such embedded devices are configured to execute software that continuously gathers data on the state of input devices in order to control the state of output devices. An embedded device typically includes a processor including volatile memory, non-volatile memory comprising an application program, and input/output ports for connecting to other devices or automation facilities.

Hereinafter, automation facilities and parts of automation facilities are referred to as automation devices or devices in the automation systems domain.

Although modular software (e.g., often referred as »app«, according to the common understanding of a mobile app) is known in the field of mobile communication devices such as smartphones and tablet computers, such modular software concepts are still lacking in the automation systems domain.

Enabling new functionality on an automation device in the same manner as currently known mobile apps meets considerable challenges. To begin with, devices or »things« are typically parts of larger systems that evidently have a higher complexity than a smart phone. A multiplicity of properties, capabilities, and existing functionalities are to be taken into account when providing a new functionality: Consequently, the initial challenge is to discover existing functionalities on which the new functionality will be based upon. A second challenge is to create a new functionality with minimal human effort providing an automatic check whether a target device has the capability to deploy the new functionality in terms of required properties, hardware, etc. Still further, the functionality is to be managed on an embedded automation device with minimal effort. Managing functionality may include the process of deployment, re-configuration, and removal of the respective modular software.

According to currently employed methods, the task of implementing new functionality on an automation device is achieved by software engineering based on a model-driven design. According to this model-driven design, an engineer specifies a field function or a data point in a model. Subsequently, a long phase of code phase of generation for defining the functionality is taking place, where the code design requires adherence to the runtime environment that is already embedded in the device. After a process of compilation and instantiation of the code, a skeleton of a service is provided, whereby the service skeleton is supposed to implement a function or data point. Finally, the engineer is to deploy the service skeleton in the runtime environment of the device and starting the skeleton in order to carry out extensive testing.

Although these methods are capable of implementing new functionality, the methods are time-consuming, cumbersome, and not least limited with respect to flexibility in that the methods do not provide machine-based discovery of capabilities.

SUMMARY AND DESCRIPTION

There is a need in the art for software modules that are conceptually related to modular apps, being deployable and executable in an automated manner on an embedded automation device. For example, an automation function or a service may need to be identified and discovered based on own functional or non-functional properties, including capability, availability, time, or location of such device.

Further, there is a need in the art for software modules providing enhanced or new utilization opportunities for embedded automation device, the software modules supporting straightforward possibilities for creation, discovery, and deployment of the modular software.

Still further, there is a need in the art for a digital distribution platform for software modules, which is commonly referred to as »marketplace«.

The present embodiments relate to a method for amending or adding functionality to an automation device in an automation systems domain. The method includes providing at least one first semantic model on the automation device. The first semantic model semantically represents the device. At least one second semantic model is provided for semantically representing the functionality. The second semantic model includes an event part and a semantic part. The second semantic model is deployed within the device. A semantic part of the second semantic model is interpreted by a semantic reasoner, and requirements of the second semantic model are matched with device capabilities of the first semantic model. An event part of the second semantic model is executed by an event processing engine.

According to one or more of the present embodiments, a semantic representation is provided as a basis for representing the functionality to be amended or added. Even further, the semantic model for semantically representing the functionality is not only interpretable but also executable. The semantic approach enables a formal representation capable of a machine-based discovery of the functionality and, at the same time, a machine interpretation and execution by the device itself. According to one or more of the present embodiments, the machine interpretation and execution is carried out by a semantic reasoner and an event processing engine, respectively, which are both part of a runtime environment implemented on the device. The approach eliminates the need of implementing a code skeleton by an engineer. Instead, the semantic model may be directly executed in a device that has an embedded runtime with reasoning capabilities.

Advantageously, devices or automation functions and services in automation systems are semantically described such that machines or other devices are able to understand and interpret semantic descriptions in order to autonomously allocate appropriate automation resources. With the aid of the semantic reasoner, the device is capable of discovering the functionality based on semantics of the device and dynamically installing the functionality. This increases autonomy of automation systems, as the human role between design and deployment phase is decreased.

The present embodiments allow for a faster development of added-value functionalities or apps. Despite the new semantic approach, one or more of the present embodiments are still compatible with model-driven design. In other words, the present embodiments extend the current state of the practice.

DETAILED DESCRIPTION

Hereinafter, embodiments are illustrated by an exemplary use case. According to this exemplary use case, an automation system includes a device providing temperature measurements every ten seconds. For regular operation or testing purposes, this device provides a functionality of delivering an average temperature that is a result of an average value of the temperature measurements (e.g., averaged over a time period of 30 minutes).

Although the device may not provide the average temperature, the device may be capable of installing a modular software (e.g., app) for extending the currently available functionality of delivering discrete temperature measurements by a functionality of delivering an average value of the temperature measurements. This capability of installing modular software implementing a desired functionality is an object of the present embodiments.

A rapid app environment in which this new functionality may be developed, verified, and used with minimal effort (e.g., without the need to manually implement) is to be provided, installed, configured and the functionality is to be tested on each device.

Using the proposed embodiments, an engineer creates a semantic model fulfilling desired functionality requirements with respect to a function, time window, location, and other properties. The semantic model is deployed in a selected device, there immediately providing the new functionality.

According to a first feature, at least one semantic model that semantically represents the device is provided. A semantic model is generally understood as a formal specification of terminology and concepts, as well as the relationships among those concepts, relevant to a particular domain (e.g., the automation systems domain). Semantic models provide insight into the nature of information particular to a given domain and are essential to any attempts to arrive at a shared understanding of the relevant concepts. Semantic models may be specified at various levels of complexity and formality depending on the domain.

Figure 1:
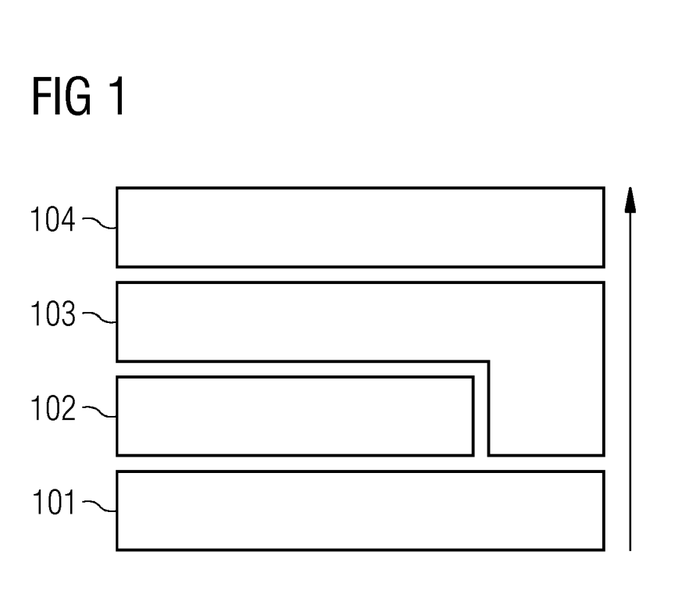
FIG. 1 shows a block diagram of a semantic model for representing a device according to an embodiment.

FIG. 1 shows a structure of a semantic model for representing a device. The semantic model includes four layers 101, 102, 103, 104 that are ordered in an ascending hierarchy, which is illustrated in FIG. 1 by an arrow. Upper layers following the arrow direction have a higher degree of semantic enrichment and domain dependency.

In the first layer 101 captioned »Device Description«, a particular device is described based on properties and functionalities. For example, Thing Description (TD) proposed by the Web of Things (WoT) group of the World Wide Web Consortium (W3C) is an example model that may be used for this purpose. Thing Description provides a model for a device, including sensors, actuators, controllers, etc., in terms of metadata and properties, as well as events raised by the device or actions that may be triggered by the device. A vocabulary used in the device description layer 101, for the purpose of naming events, properties, actions, etc., is provided by semantic models from the higher layers.

In the second layer 102 captioned »Domain Independent Model«, the device description 101 is extended by domain independent contextual information. The independent contextual information may exemplarily include a semantic description that the particular device is a sensor along with basic measurement capabilities (e.g., range, operating conditions, unit, etc.). For this purpose, ontologies including but not limited to SSN (Semantic Sensor Network), QUDT (Quantities, Units, Dimensions and Types), or similar may be used.

In the third layer 103 captioned »Domain Dependent Model«, the device description 101 is extended by domain dependent contextual information (e.g., referring to a particular domain like building automation, industry automation, energy domain, etc.). The dependent contextual information may exemplarily include a semantic description characterizing a concrete sensor device by assigning a complete set of properties and capabilities that are provided by a manufacturer of that concrete device. The dependent contextual information may further include contextual information such as a definition of the location of the device. Examples of domain dependent models include eCl@ass, Haystack, BaaS (Building as a Service) ontology, etc. In some cases, there is no need to distinguish between the second layer 102 and the third layer 103. Hence, the second layer 102 and the third layer 103 may be merged into one common layer.

In the fourth layer 104 captioned »Application Model«, the previously described models according to the first three layers 101, 102, 103 are extended with information related to a particular application. For example, this layer may define models for an application related to diagnosis of building automation systems or a condition monitoring application in manufacturing.

Figure 2:
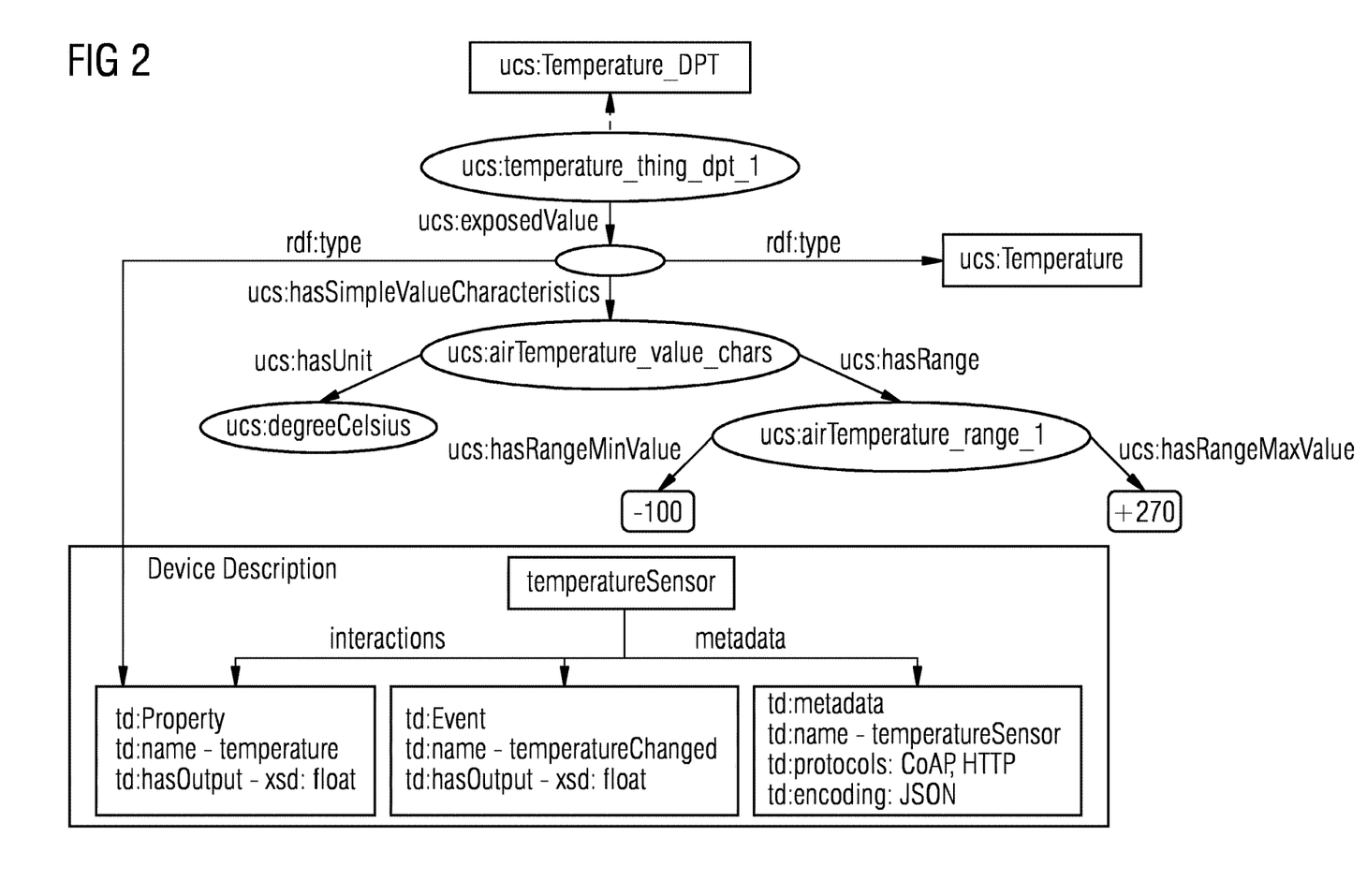
FIG. 2 shows a block diagram of an exemplary device description for a temperature sensor.

FIG. 2 shows an example of a semantic model for representing a temperature sensor. In the upper part of FIG. 1, a domain dependent model according to the third layer 103 of FIG. 1 is depicted, the lower boxed part includes a device description according to the first layer 101 of FIG. 1. The device description in the boxed part is based on the current version of World Wide Web Consortium on Thing Description or TD (denoted with prefix »td:«) and extended with BaaS ontology as a Domain Dependent Model in the domain dependent model above. Both, the Thing Description and BaaS ontology may be replaced with similar semantic models.

Figure 3:
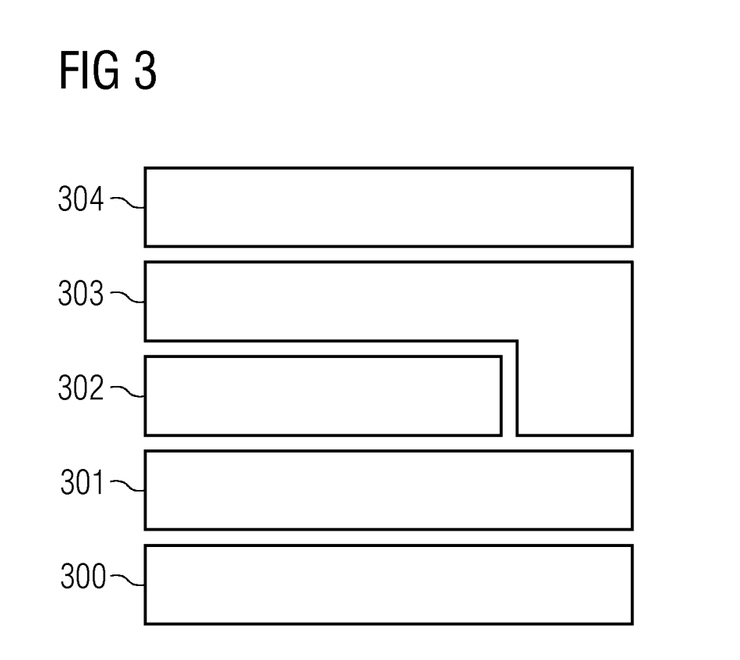
FIG. 3 shows a block diagram of a semantic model for semantically representing a functionality according to an embodiment.

FIG. 3 shows a block diagram of a second semantic model for semantically representing a functionality. Similar to the first semantic model shown in FIG. 1, the second semantic model according to FIG. 3 includes a first layer 301 captioned »Device Description«, a second layer 302 captioned »Domain Independent Model«, a third layer 303 captioned »Domain Dependent Model«, and a fourth layer 304 captioned »Application Model«. In addition to the first semantic model shown in FIG. 1, the second semantic model according to FIG. 3 includes an additional layer 300 captioned »App Vocabulary«, which is hierarchically located underneath the device description layer 301.

The App Vocabulary layer 300 is the event part describing a function (e.g., the functional part of the semantic model). App Vocabulary 300 serves to semantically describe an automation function or a field analytic function (e.g., the initially referred functionality of computing an average temperature that is measured over a 30-minute time window).

The second semantic model for semantically representing the functionality is created with App Vocabulary 300. The App Vocabulary layer 300 may further be a part of the device description layer 301, and may be extended with other semantic layers 302, 303, 304 according to FIG. 3. This is an important aspect, as it enables semantic matchmaking, described later in this specification, of functionality requirements or app requirements with capabilities of a device.

As app requirements are described with a second semantic model according to FIG. 3 and capabilities of the device are represented with a first semantic model according to FIG. 1, semantic matchmaking may take place at each level of the stack of layers, starting from the respective Device Description level 101, 301.

Although the standardization specification WoT (Web of Things), issued by the World Wide Web Consortium or »W3C« on Thing Description (TD), provides a minimal model for describing a device, matchmaking at this level is limited. The enrichment of the Device Description by further models specifying device capabilities and App requirements provides for sufficient details for an improved matchmaking according to embodiments.

Figure 4:
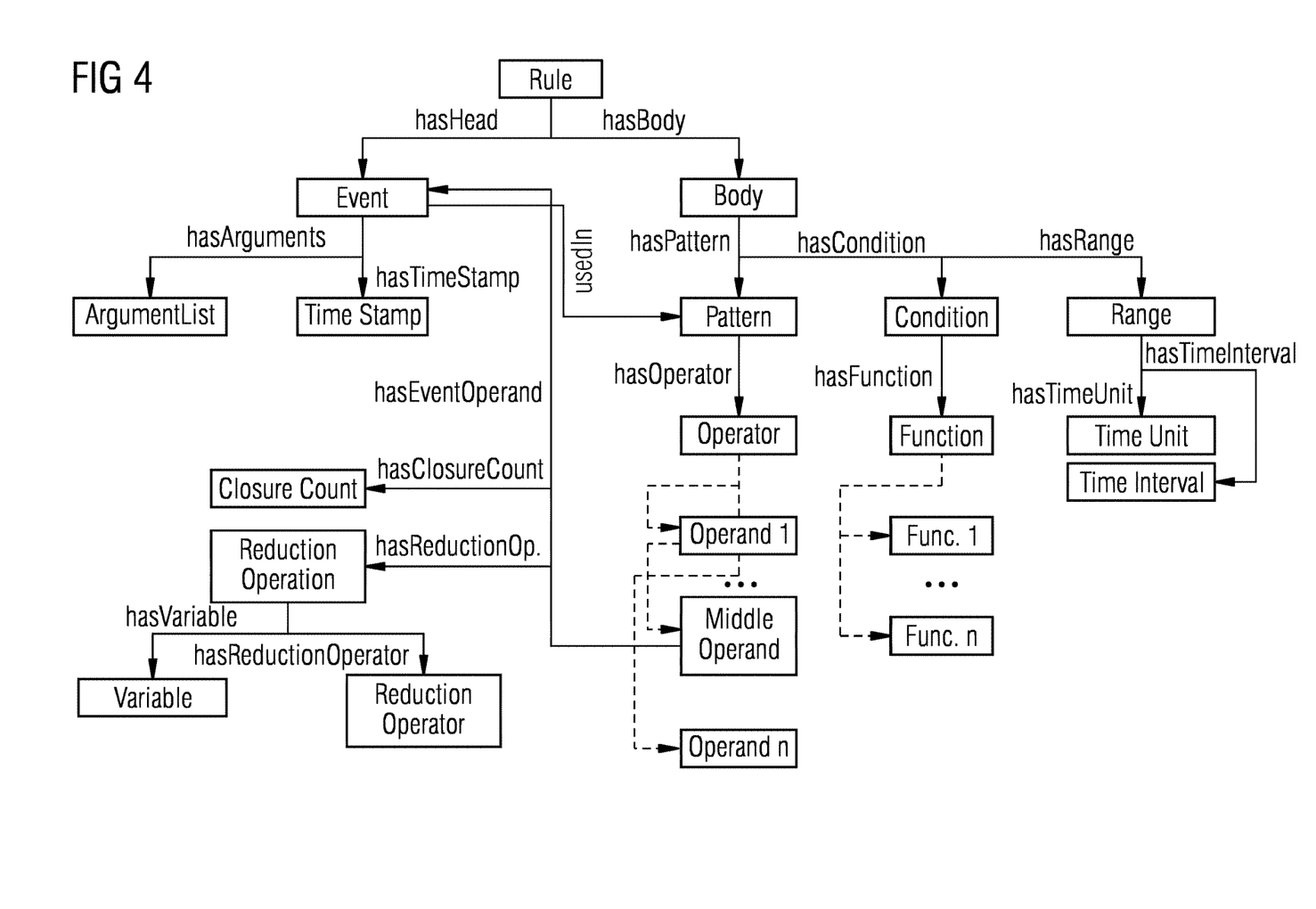
FIG. 4 shows a block diagram of an event part of a semantic model for semantically representing a functionality according to an embodiment.

FIG. 4 shows an exemplary event part or App Vocabulary of a second semantic model. The functionality or app is represented as a rule including: Pattern, including one or more operators over events (e.g., operators include sequence, conjunction, disjunction, negation, Kleene operator, and others); and Condition, including one or more functions (e.g., a function includes an arithmetic operation or any function in general). Functions are typically evaluated over data produced by devices (e.g., temperature sensor data). The functions may be implemented in various programming languages (e.g., Java, Lua, C/C++ etc.). Regardless of the language in which a function is implemented, a semantic representation is provided. The functionality or app is represented as a rule also including: Range, which defines a time interval over which Event Operators are evaluated and Condition Functions are applied. For example, when computing the average temperature over a 30-minute time window, the Range is 30 minutes. Every temperature reading from the sensor is an Event, Operator is the sequence of Events, and Condition Function is a function that computes the average value out of single temperature readings.

Figure 5:
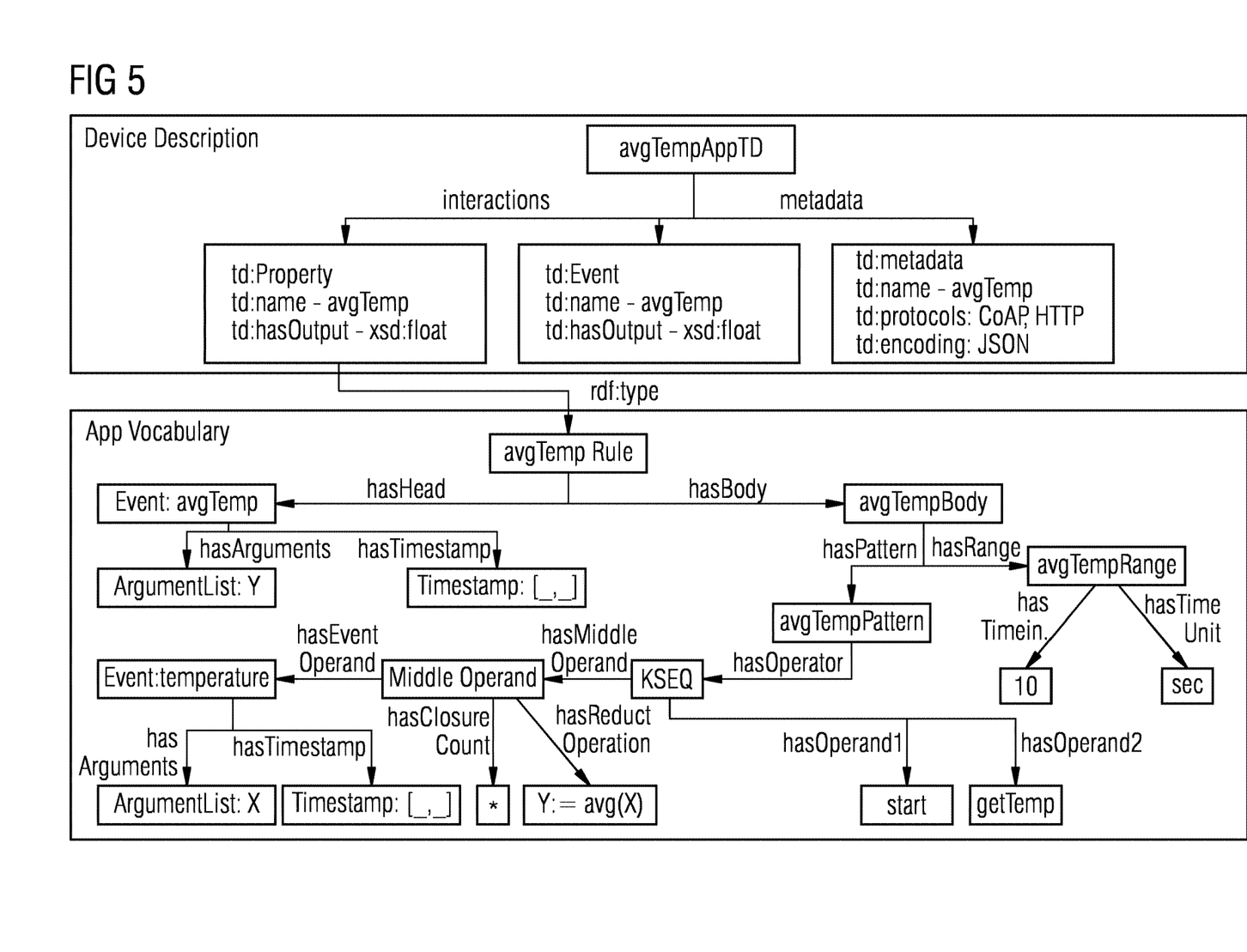
FIG. 5 shows a block diagram of a semantic model for semantically representing a functionality for delivering an average temperature according to an embodiment.

FIG. 5 shows a second semantic model for delivering an average temperature including an event part or App Vocabulary in the lower box and a Device Description in the upper box.

Figure 6:
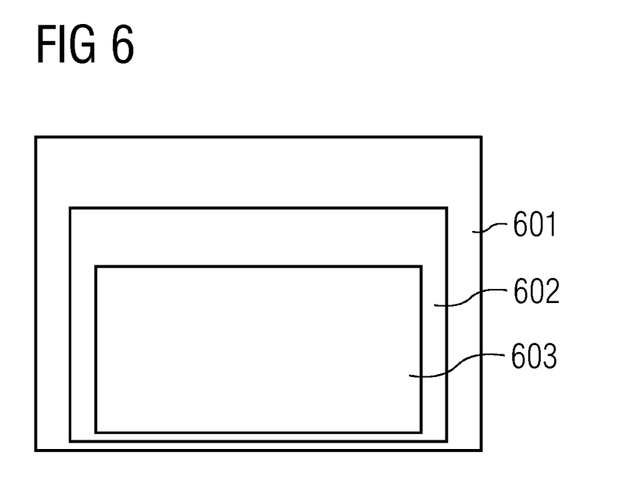
FIG. 6 shows a block diagram of building blocks of one embodiment of a device.

FIG. 6 shows basic building blocks of a device 601 that is capable of executing the second semantic model. The device 601 includes, among other functional parts, a runtime environment 602 including an event processing engine and a semantic reasoner, both depicted in a unit 603.

In general case, the second semantic model includes an event part and a semantic part. The event part (e.g., Pattern, Event Condition and Range) is executed by the event processing engine 603, while the semantic part (e.g., semantic Condition) is interpreted by the semantic reasoner 603. The latter semantic reasoner is matching requirements of the second semantic model for semantically representing the functionality with device capabilities of the first semantic model.

Figure 7:
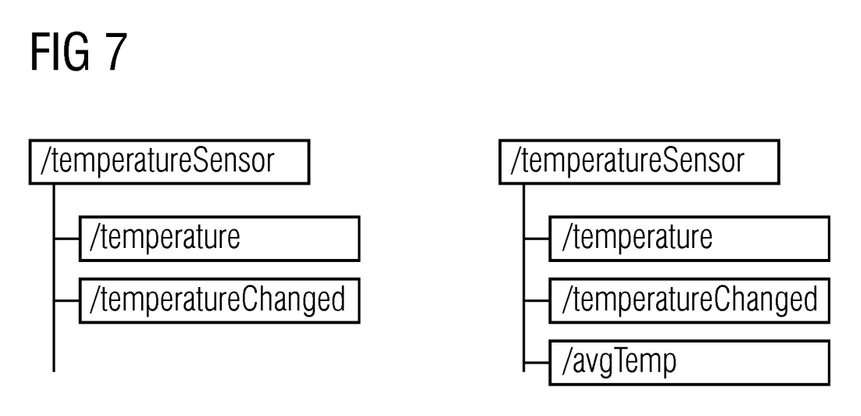
FIG. 7 shows a resource tree for characterizing a device functionality before and after dynamic addition of a new functionality.

FIG. 7 shows a resource tree in a RESTful illustration for characterizing a device functionality before and after dynamic addition of a new functionality.

The runtime environment 602 that executes the second semantic model for semantically representing the functionality is enabled to dynamically register new resources (e.g., field functions as defined in the second semantic model for semantically representing the functionality).

For example, a device with a Device Description, as shown in FIG. 2, has initially only two resources: a resource »temperature« (see the Property captioned »td: name—temperature« in the Device Description of FIG. 2) for delivering a temperature measurement; and an event notifier »temperatureChanged« (see the Event »td: name—see temperatureChanged« in the Device Description of FIG. 2).

In the left part of FIG. 7, these two resources are depicted in a RESTful illustration of resource tree for characterizing the device functionality before a dynamic addition of a new field function. After adding the new field function for delivering the average temperature to the device the resource tree of the device (see the right side of FIG. 7) is dynamically updated without explicit or human intervention.

In the following, a semantic based discovery according to an embodiment is described. Semantic models according to embodiments enable semantic based discovery of relevant resources offered by devices or functionality providing apps. Queries used for discovery purposes may be posed either by humans or machines (e.g., devices). In continuation of the introductory example for a functionality for reading out an average temperature by a functionality »avgTemp«, it is an object of further embodiments to discover resources of this avgTemp functionality or app.

Assuming that the functionality of avgTemp is semantically represented by Thing Description at the Device Description level 301 and a BaaS ontology at the level 303 of Domain Dependent Model, the following query returns the app name from the TD entry, and features of this app such as the type of data exposed by the app, the measuring unit, and minimum and maximum range of the data:

```
PREFIX td: <http://www.w3c.org/wot/td#>
PREFIX ucs: <http://www.baas-itea2.eu/dp/ucs#>
PREFIX rdf: <http://www.w3.org/1999/02/22-rdf-syntax-ns#>
SELECT ?app ?app_datapoint ?app_exposedData
?app_exposedDataType
?app_data_unit ?app_min_data_range
?app_max_data_range
WHERE {
?implementedFuction       ucs:implementsFunction
                          ?implementedAppFuction .
?implementedAppFuction    rdf: type td:Property ;
                          td:name ?app .
?implementedFuction       rdf:type
                          ucs:Building_Automation_Function .
?app_datapoint            ucs:implementsFunction
                          ?implementedFuction ;
                          ucs:exposedValue ?app_exposedData.
?app_exposedData          rdf:type ?app_exposedDataType.
?App_exposedData          ucs:hasSimpleValueCharacteristics
?data_chars .
?data_chars               ucs:hasUnit ?app_data_unit ;
                          ucs:hasRange ?data_range.
?data_range               ucs:hasRangeMinValue
                          ?app_min_data_range ;
                          ucs:hasRangeMaxValue
                          ?app_max_data_range.
FILTER( ?app =
"ruleResourceVocab:avgTemp"^^<http://www.w3.org/2001/
XMLSchema#string> )
}
```
This query may also be narrowed by replacing certain variables, for example, ?implementedAppFuction, app_data_unit, data_range by specific values (e.g., for discovering of apps implementing a particular function or providing data in a certain unit or range).

For each discovered app, based on a semantic description, requirements for that app may be extracted. For example, the avgTemp app is associated with a temperature data point (e.g., this app deals with temperature data). Therefore, this app requires a temperature sensor to be available on the device where the app runs. This app requires a temperature sensor to provide the data in certain unit (e.g., Celsius), and within a certain range (e.g., from −10 C up to +100 C).

In the following, semantic matchmaking according to an embodiment is described. While the discovery of an app aims a query for desired characteristics and requirements, matchmaking follows the aim of mapping app requirements with capabilities of a device on which the app is deployed or installed.

Both app requirements and device capabilities may be described as data points in the BaaS ontology at the level of Domain Dependent Model 103, 303. Hence, the matchmaking amounts to the problem of finding a device data point that semantically has an equivalent description as the app data point. Based on the semantic part of the second semantic model of the app, a query for suitable devices is possible.

For example, if the discovery query
?app_exposedData rdf: type ucs:Temperature
retrieves an app capable of exposing temperature data, a device capable of providing temperature measurements is required. The following SPARQL query will search for such devices:

```
PREFIX td:  <http://www.w3c.org/wot/td#>
PREFIX ucs: <http://www.baas-itea2.eu/dp/ucs#>
PREFIX rdf: <http://www.w3.org/1999/02/22-rdf-syntax-ns#>
SELECT ?device_datapoint ?device_features ?datapoint_unit
WHERE{
?device_datapoint      ucs:exposedValue ?blank .
?blank                 rdf:type         ?device_features .
?datatype              rdf:type         ?device_features;
                       ucs:hasSimpleValueCharacteristics ?data_chars .
?data_chars            ucs:hasUnit      ?datapoint_unit
FILTER ( ?device_features = ucs:Temperature )
}
```

Similar to the semantic based discovery described above, this semantic matchmaking query may also be narrowed by replacing certain variables (e.g., by replacing the variable) ?datapoint_unit
by a specific unit (e.g., Celsius), as this unit was extracted from the app description. Similarly, other properties and capabilities of a device that fulfill requirements of an app may be specified.

If a result is retrieved by the query, a match is found, which provides that if there is a device data point fulfilling the app requirements, this device is exactly capable of delivering data expected by the app. The data is provided by an expected unit, range and, other measurement capabilities. Further on, other specifiable characteristics and properties of a device may be met, such as an expected location. A successful match provides the App may be deployed or installed on the device.

Figure 8:
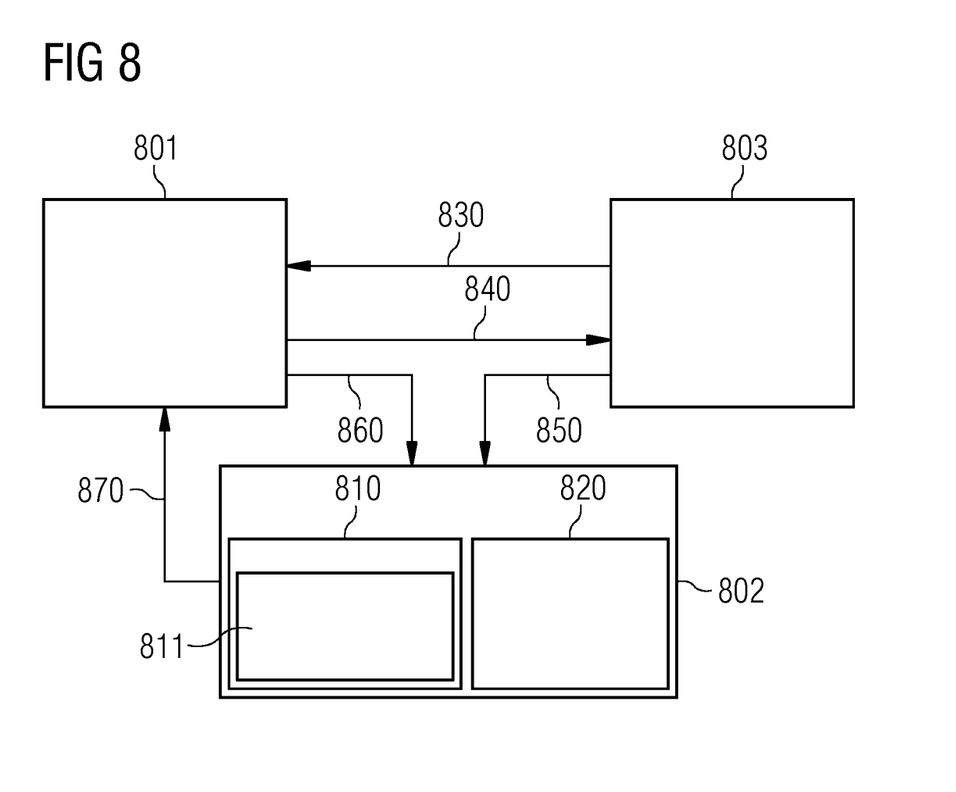
FIG. 8 shows a block diagram of basic building blocks of a marketplace.

In the following, basic building blocks of an app marketplace are described with reference to FIG. 8.

A device 802 is capable to execute a semantic model of an app. The device 802 dynamically creates a new resource that is essentially a new field function represented by a semantic model. This feature is provided by a runtime environment including a processing engine and a semantic reasoner 811. The device 802 optionally provides a standard device runtime environment 820 in order to execute software for legacy automation systems.

A semantic repository 801 for devices and apps stores semantic models as described previously. The semantic repository 801 also provides querying and reasoning capabilities as needed for the discovery and matchmaking. An app may be downloaded and installed by the device 802 via an interface 860.

A code library 803 provides a library of software for legacy automation environments or legacy automation functions, which is more conveniently executed in traditional or legacy execution environments (e.g., based on model-driven design and code generation). Legacy automation functions may be downloaded and installed by the device 802 via an interface 850.

The semantic repository 801 provides an interface 870 to devices for manipulating a Device Description. Further on, the semantic repository 801 is configured to add, update, delete, or query a device description. Device 802 is also able to query the semantic repository 801 via interface 870 in order to search for apps.

Once discovered, apps may be downloaded and installed from semantic repository to the device 802 via interface 870. These Apps may be defined directly via semantic models or provided by the code library 803. For the latter case, legacy automation functions of the code library 803 are to be semantically annotated via interface 830 with semantic vocabulary provided by semantic repository. The semantic repository 801 also registers legacy automation functions of the code library 803 via interface 840 in order to make the legacy automation functions discoverable.

In the following, a basic workflow of methods related to the building blocks of the App Marketplace according to an embodiment is described.

In a development phase of an automation system, a typical object is to create a new functionality (e.g., the already referenced avgTemp). An engineer starts this task first by exploring semantic models in the Semantic Repository 801. For example, the Domain Dependent Model 303 and layers below the Domain Dependent Model 303 are being explored.

In this way, the engineer examines the position of the new App with respect to the domain of interest and identifies ontology entities relevant for describing the app. Once the app is semantically described, a representation is stored in the Semantic Repository.

In the engineering phase, an engineer may search existing apps in the Semantic Repository 801. Apps of interest may be instantiated, configured, and localized. This additional information is also stored in Semantic Repository as a part of an app semantic representation that is provided in the development phase. Once the semantic model of an app is created, the app is ready to be deployed or installed on a device.

During the engineering process, the engineer proceeds with a process of matchmaking in order to identify an appropriate device for the discovered app. This step may also be undertaken in the operation phase or in the maintenance phase.

It may be desired that either a human or device modifies an ongoing automation process. For example, a robot requests an app to use underused resources from another device (e.g., a machine or robot). Therefore, an app may be dynamically installed on a device during the operation phase.

For the case that a technical malfunction occurs on a device that needs to be replaced, a new device is to install apps including corresponding functionalities and configurations.

An inclusion of configurations and functionalities is provided by the embodiments in that the semantic models of functionalities or apps include all relevant information on configuration and functionality as an integral part of the functionality, along with the provision of directly executing these semantic models directly on devices of one or more of the present embodiments.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for amending or adding new functionality to an automation device in an automation systems domain, the method comprising:
providing at least one first semantic model on the automation device, the first semantic model semantically representing device capabilities of the automation device;
providing at least one second semantic model for semantically representing the new functionality, the second semantic model comprising an event part and a semantic part;
deploying the second semantic model within the automation device;
interpreting, by a semantic reasoner, the semantic part of the second semantic model semantically representing the new functionality and matching requirements of the second semantic model with the device capabilities of the automation device of the first semantic model; and
executing, by an event processing engine, the event part of the second semantic model semantically representing the new functionality.

2. The method of claim 1, wherein the first semantic model and the second semantic model include at least a first layer and a second layer ordered in an ascending hierarchy, and
wherein the second layer has a higher degree of semantic enrichment and domain dependency.

3. The method of claim 1, wherein the first semantic model and the second semantic model include a device description layer.

4. The method of claim 1, wherein the first semantic model and the second semantic model include a domain independent model layer for providing domain independent contextual information.

5. The method of claim 1, wherein the first semantic model and the second semantic model include a domain dependent model layer for providing domain dependent contextual information.

6. The method of claim 1, wherein the first semantic model and the second semantic model include an application model layer for providing information related to a particular application.

7. The method of claim 1, wherein the second semantic model includes an app vocabulary layer, the app vocabulary layer comprising the event part and the semantic part of the second semantic model.

8. The method of claim 7, wherein the app vocabulary layer includes a rule comprising at least one pattern, at least one condition, at least one range defining a time interval over which one of the operators are evaluated and for which conditions are applied, or any combination thereof, each pattern of the at least one pattern comprising one or more operators over events, each condition of the at least one condition comprising one or more functions.

9. The method of claim 1, further comprising semantically matching capabilities of the device with functional requirements of the new functionality, semantically matching comprising matchmaking the first semantic model and the second semantic model.

10. The method of claim 1, wherein the provision of the second semantic model is preceded by a semantic based discovery of relevant resources offered by a device, a functionality, or the device and the functionality.

11. The method of claim 10, wherein the semantic based discovery is supported by a semantic repository of an app marketplace.

12. The method of claim 1, further comprising dynamically registering, by the runtime environment, new resources provided by the amended or added new functionality.

13. The method of claim 12, wherein the first semantic model and the second semantic model include a device description layer.

14. The method of claim 13, wherein the first semantic model and the second semantic model include a domain independent model layer for providing domain independent contextual information.

15. The method of claim 14, wherein the first semantic model and the second semantic model include a domain dependent model layer for providing domain dependent contextual information.

16. The method of claim 15, wherein the first semantic model and the second semantic model include an application model layer for providing information related to a particular application.

17. The method of claim 16, wherein the second semantic model includes an app vocabulary layer, the app vocabulary layer comprising the event part and the semantic part of the second semantic model.

\* \* \* \* \*